United States Patent Office 3,551,414
Patented Dec. 29, 1970

3,551,414
6,7-DIHYDRO-5H-DIBENZ[c,e]AZEPIN-7-ONES
John O. Hawthorne and Edward L. Mihelic, Penn Hills Township, Allegheny County, Pa., assignors to United States Steel Corporation, a corporation of Delaware
No Drawing. Continuation-in-part of application Ser. No. 529,258, Feb. 23, 1966. This application May 16, 1969, Ser. No. 825,440
Int. Cl. C07d 41/08
U.S. Cl. 260—239.3                                   4 Claims

ABSTRACT OF THE DISCLOSURE

N-substituted 2 - aminomethyl-2'-biphenylcarboxylic acid and derivatives thereof are prepared by reacting 2-formly-2'-biphenylcarboxylic acid or an ester thereof with ammonia or a primary amine with hydrogenation of the product. The compounds are useful as intermediates in the preparation of 6-substituted-6,7-dihydro-5H-dibenz[c,e]-azepines which may be used to inhibit or reverse the physiological effect of epinephrine.

---

This application is a continuation-in-part of application Ser. No. 529,258, filed Feb. 23, 1966 now abandoned This invention relates to N-substituted 2-aminomethyl-2'-biphenylcarboxylic acid and derivates thereof and a method for their preparation. The compounds are useful as intermediates in the preparation of 6-substituted-6,7 - dihydro-5H-dibenz[c,e]-azepines. The latter have adrenolytic properties and may be used to inhibit or reverse the physiological effect of epinephrine (U.S. Pat. 3,075,96).

This invention provides compounds having the following general structural formula

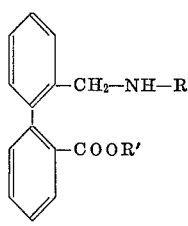

wherein R in hydrogen, a lower alkyl radical preferably having 1–3 carbon atoms such as methyl, ethyl, propyl or isopropyl; aryl containing only one benzene ring system and preferably phenyl or tolyl; cycloakyl containing a five or six member carbon ring and preferably cyclopentyl or cyclohexyl; or arlkyl containing only one benzene ring system, preferably benzyl. The preferred compounds of the invention are those wherein R is lower alkyl having 1–3 carbon atoms. R' may be hydrogen or lower alkyl preferably containing 1–3 carbon atoms such as methyl, ethyl, propyl or isopropyl. The compounds of this invention are prefarbly prepared by reacting 2-formyl-2'-biphenylcarboxylic acid under reducing codnitions with ammonia or a primary amine, the organic radical of which corresponds to the radical R in the foregoing formula. Thus, in addition to ammonia, suitable compounds are methylamine, ethylamine, propylamine, isopropylamine, aniline, para-tolylamine, cyclopentylamine, cyclohexylamine, benzylamine and the like.

If instead of the acid, a lower alkyl ester of the acid such as the methyl, ethyl, propyl or isopropyl ester of 2-formyl-2'-bipenylcarboxylic acid is used, compounds having the general formula

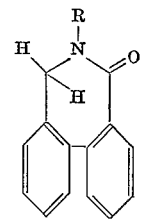

wherein R represents the same radicals as above are produced execept where aniline is the starting material and then ring closure does not occur so that one obtains a lower alkyl 2-phenylaminomethyl-2'-biphenylcarboxylate. Hydrolysis of the latter type of ester gives the corresponding amion acid.

The reactant 2-formyl-2'-biphenylcarboxylic acid or the lower alkyl ester therof is readily prepared from the ozonolysis of phenanthrene [P. S. Bailey, Journal of the American Chemical Society, volume 78, 3811 (1956)].

The process of the invention involves the reaction of 2-formyl-2'-biphenylcarboxylic acid or its lower alkyl ester with ammonia or a primary amine under reducing conditions preferably in the presence of a polar solvent that is inert to the reactants under the reaction conditions. It is also preferred to carry out the reaction in the presence of a catalyst such as nickel, palladium or platinum. The reaction is carried out at a temperature in the range of from about 20° C. to about 150° C, preferably 50 to 100° C. The reaction may be carried out at atmospheric pressure or at higher pressures up to about 150 p.s.i.g. The reaction time is adjusted within the discretion of the operator to give a satisfactory yield. Generally speaking, at the reaction conditions set forth above a reaction time for a bath process of 1.5–30 hours is preferred.

Any suitable polar solvent that is inert to the reactants under the reaction conditions may be used including, for example, methanol, ethanol, tetrahydrofuran, dioxane and the like.

It is preferred to use at least one mole of ammonia or primary amine per mole of the acid or ester reactant, preferably a slight excess of the ammonia or amine is used. The presence of the solvent is not strictly necessary but it is preferred that the reaction product be dissolved in the solvent, preferably a lower alkanol for succeeding stages of reaction. The initial novel product of the invention can be isolated, however, if desired. This primary reaction product need not be isolated prior to formation of the azepinone which may in turn be used to prepare an azepine useful as set forth above.

The use of the compounds of the present invention as starting materials for the azepines is illustrated by the following sequence of reactions. Examples 1–6 illustrate reaction I, Example 7 illustrates reaction II, Examples 8–12 illustrate reaction III, Examples 13 and 14 illustrate reaction IV and Example 15 illustrates reaction V.

In Examples 1, 2, 8 and 9, R is methyl. In Examples 5, 11 and 12, R is benzyl. In Examples 6, 13 and 14, R is phenyl. In Examples 3, 4, 7, 10 and 15, R is hydrogen.

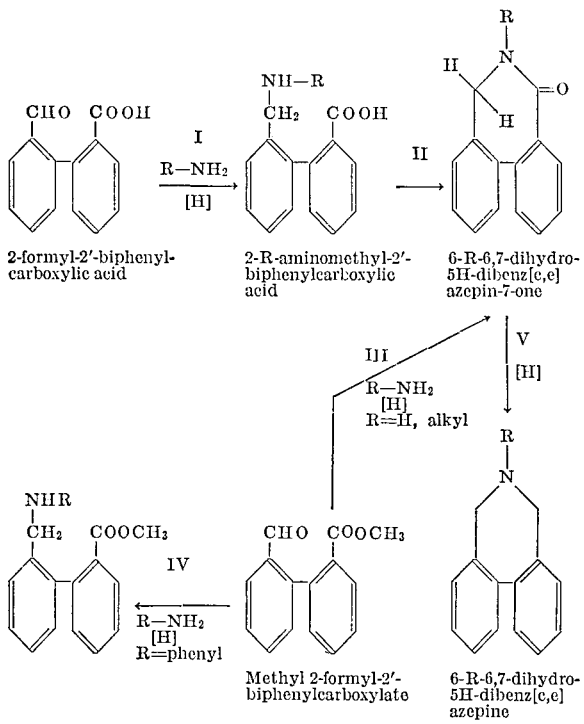

2-formyl-2'-biphenyl- carboxylic acid

2-R-aminomethyl-2'- biphenylcarboxylic acid

6-R-6,7-dihydro- 5H-dibenz[c,e] azepin-7-one

Methyl 2-formyl-2'- biphenylcarboxylate

6-R-6,7-dihydro- 5H-dibenz[c,e] azepine

The invention is further illustrated by the following specific examples:

EXAMPLE 1

An aqueous (30%) solution of monomethylamine (4.4 ml., 0.044 mole) was added to 2-formyl-2'-biphenyl-carboxylic acid (4.5 g., 0.02 mole) in ethanol (50 ml.). Raney nickel catalyst (0.2 g.) was added, and the mixture was shaken under hydrogen (50 p.s.i.g.) at 50 C. for 20 hours. After venting and removal of the catalyst and solvent, the crude product (5.2 g.), M.P. 160–185 C., remained. Recrystallization from ethanol and then water gave 2-methylaminomethyl-2'-biphenylcarboxylic acid (2.1 g.), M.P. 224–226 C. (decomposition occurs, hereinafter abbreviated, dec.).

EXAMPLE 2

2-formly-2'-biphenylcarboxylic acid (6.0 g., 0.0265 mole) in methanol (20 ml.) and 30 percent aqueous monomethylamine (4.0 ml.) were refluxed for 15 minutes. Sodium hydrosulfite (12 g.) in water (100 ml.) was added, and the solution was refluxed for 1.3 hours The volume was reduced to 50 ml. and cooled to 20 C. Impure 2-methylaminomethyl - 2' - biphenylcarboxylic acid ((4.8 g.), M.P. 203–210 C., was collected. Purification gave a product melting at 220–224 C. (dec.).

EXAMPLE 3

A solution of 2-formyl-2'-biphenylcarboxylic acid (4.5 g., 0.02 mole), 28 percent ammonium hydroxide (6.0 ml., 0.1 mole), and ethanol (50 ml.) was contacted with hydrogen (50 p.s.i.g.) at 50 C. for 20 hours over Raney nickel catalyst (0.2 g.). Removal of catalyst and solvent gave a solid (5.0 g.) melting at 180–186 C. (dec.). Recrystallization from water gave pure 2-aminomethyl-2'-biphenylcarboxylic acid hemihydrate, M.P. 197–199 C. (dec.).

EXAMPLE 4

Ammonium hydroxide (28%, 1.5 ml.) and 5 percent palladium on alumina (0.2 g.) were added to a solution of 2-formyl-2'-biphenylcarboxylic acid (2.26 g. 0.01 mole) in methanol (25 ml.). The mixture was contacted with hydrogen (60 p.s.i.g.) at 40 C. for 1.5 hours. Removal of the catalyst and solvent gave a residue, recrystallization of which from water (50 ml.) gave 2-aminomethyl-2' - biphenylcarboxylic acid hemihydrate (2.03 g.), M.P. 197–199 C. (dec.).

EXAMPLE 5

A solution of 2-formyl-2'-biphenylcarboxylic acid (4.52 g., 0.02 mole) and benzylamine (2.35 g., 0.022 mole) in ethanol (50 ml.) was contacted with hydrogen (55 p.s.i.g.) for 30 hours at 80 C. over Raney nickel catalyst (0.1 g.). After venting the hydrogen, methanol (200 ml.) was added, and the mixture was heated to reflux. After removal of the catalyst by filtration from the hot solution, the volume of the filtrate was reduced to 50 ml. On cooling, 2-benzylaminomethyl-2'-biphenylcarboxylic acid (3.66 g.), M.P. 202–206 C. (dec.), separated. An additional 0.84 g. of product was isolated by concentrating the mother liquor. Recrystallization from methanol gave pure material, M.P. 204–206 C. (dec.).

EXAMPLE 6

2-formyl-2'-biphenylcarboxylic acid (4.52 g.) was reacted under the conditions of Example 5 with aniline (2.04 g., 0.022 mole) for 24 hours. After removal of ethanol, the crude product (6.59 g.) was triturated with cold methanol (20 ml.). 2 - Phenylaminomethyl-2'-biphenylcarboxylic acid (2.2 g.), M.P. 150–153 C., was insoluble and was collected. Recrystallization from ethyl acetate-n-heptane gave the pure compound, M.P. 153–155 C.

EXAMPLE 7

The cyclization of the amino acids to lactams is illustrated by 2-aminomethyl-2'-biphenylcarboxylic acid. The amino acid (0.36 g.) was heated at 140 C. for 3 hours at 1 mm. of mercury pressure. The material was then sublimed at that pressure and at 200 C. 6,7-dihydro-5H-dibenz[c,e]-azepin-7-one (0.28 g.), M.P. 194–196 C., was collected.

EXAMPLE 8

A solution of methyl 2-formyl-2'-biphenylcarboxylate (3.0 g., 0.0125 mole) and 30 percent aqueous monomethylamine (3.0 ml.) in 95 percent ethanol (25 ml.) was contacted with hydrogen (50 p.s.i.g.) at 50 c., for 20 hours over Raney nickel catalyst (0.2 g.). Removal of solvent and catalyst after venting the hydrogen gave the crude product (2.75 g.), M.P. 142–146 C. Recrystallization from methanol gave pure 6-methyl-6,7-dihydro-5H-dibenz[c,e]azepin-7-one, M.P. 148–149 C.

EXAMPLE 9

The procedure was the same as in Example 7, except that the hydrogenation catalyst was 5 percent palladium on alumina with a reaction time of 1.5 hours. Removal of solvent and catalyst gave 6-methyl-6,7-dihydro-5H-dibenz[c,e]azepin-7-one (2.79 g.), M.P. 148–149 C.

EXAMPLE 10

A solution of methyl 2-formyl-2'-biphenylcarboxylate (6.00 g., 0.025 mole) and 28 percent ammonium hydroxide (6 ml.) in 95 percent ethanol (50 ml.) was contacted with hydrogen (50 p.s.i.g.) at 50 c., for 20 hours over Raney nickel catalyst (0.2 g.). Removal of catalyst and solvent after venting gave the crude product (5.34 g.), M.P. 143–150 C. Recrystallization from benzene gave 6,7-dihydro-5H-dibenz[c,e]azepin-7-one (4.00 g.), M.P. 191–194 C. Melting point of the pure compound is 194–195 C.

EXAMPLE 11

Benzylamine (1.37 g., 0.0128 mole) was added to methyl 2-formyl-2'-biphenylcarboxylate (3.0 g., 0.0125 mole) in methanol (25 ml.). The solution was refluxed for 15 minutes. A solution of sodium hydrosulfide (15 g.) in water (75 ml.) was added, and the mixture was refluxed for 1.5 hours. The mixture was cooled to ambient temperature, and the aqueous phase was decanted from a precipitated oil. A benzene solution of the oil was washed with water and dried over potassium hydroxide. After evaporation of the benzene on a steam bath, the oil was dissolved in n-heptane (100 ml.). Upon concentrating the volume to approximately 30 ml. and cooling the solution, crystals of 6 - benzyl - 6,7-dihydro-5H-dibenz[c,e]azepin-7-one (2.66 g.), M.P. 111–113 C., formed. Recrystallization from methanol gave the pure compound, M.P. 114–115 C.

EXAMPLE 12

A solution of methyl 2-formyl-2'-biphenylcarboxylate (2.40 g., 0.01 mole) and benzylamine (1.10 g., 0.01 mole) in methanol (25 ml.) was contacted with hydrogen (60 p.s.i.g.) over 5 percent palladium-on-alumina catalyst (0.2 g.) for 2 hours at 40 C. After venting the hydrogen, the catalyst and solvent were removed to leave the crude product (3.2 g.). This material was dissolved in ethyl ether and reacted with hydrogen chloride. The crystalline hydrochloride that formed was largely dissolved in water (100 ml.). A small quantity of insoluble material was removed by filtration. The aqueous filtrate was neutralized by 7 percent aqueous sodium bicarbonate solution. The precipitated product was recrystallized from isopropyl alcohol to give 6-benzyl-6,7-dihydro-5H-dibenz[c,e]azepin-7-one (2.03 g.), M.P. 112–113 C.

EXAMPLE 13

A solution of methyl 2-formyl-2'-biphenylcarboxylate (3.00 g., 0.0125 mole) and aniline (1.19 g., 0.0128 mole) in toluene (25 ml.) was refluxed for 0.75 hour. Water of reaction was collected in a Dean-Stark trap. The oil resulting from the removal of the toluene was dissolved in 95 percent ethanol (25 ml.) and contacted with hydrogen (55 p.s.i.g.) over Raney nickel catalyst (0.2 g.) for 24 hours at 60 C. Removal of catalyst and solvent gave the crude product (3.77 g.), M.P. 61–69 C. Recrystallization from isopropyl alcohol gave methyl 2-phenylaminomethyl - 2' - biphenylcarboxylate, M.P. 76–77 C.

EXAMPLE 14

A solution of methyl 2-formyl-2'-biphenylcarboxylate (2.40 g., 0.01 mole) and aniline (1.0 g., 0.01 mole) in methanol (25 ml.) was contacted with hydrogen (60 p.s.i.g.) over 5 percent palladium-on-alumina catalyst (0.2 g.) for 2 hours at 40 C. Removal of catalyst and solvent gave the crude product (3.03), M.P. 70–73 C. Recrystallization from isopropyl alcohol gave methyl 2-phenylaminomethyl - 2' - biphenylcarboxylate (2.18 g.), M.P. 75–77 C.

EXAMPLE 15

6,7-dihydro-5H-dibenz[c,e]azepin-7-one (3.00 g.) was reduced to 6,7 - dihydro - 5H - dibenz[c,e]azepine by the action of lithium aluminum hydride (0.8 g.). An ether (200 ml.) suspension of the hydride was refluxed in a Soxhlet extractor, in which a thimble contained the azepinone. After 21 hours of extraction, the residual hydride was decomposed by water. Inorganic material was removed by filtration, and ether was evaporated from the filtrate. The residue was refluxed with water (250 ml.) and concentrated hydrochloric acid (1 ml.). Unreacted azepinone (0.76 g.) was collected by filtering the suspension while it was hot. The aqueous filtrate was cooled and made basic with 5 percent aqueous sodium hydroxide solution. The precipitated oil was extracted into ether, and the ether extract was dried over potassium hydroxide pellets.

It is to be understood that the foregoing working examples are given for the purpose of illustration and that any other suitable amine, temperature, pressure or the like, could be used provided that the teachings of this disclosure are followed.

We claim:
1. A compound of the formula

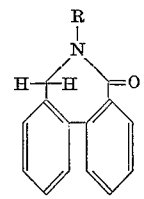

wherein R is hydrogen or lower alkyl having 1–3 carbon atoms.
2. 6,7-dihydro-5H-dibenz[c,e]azepin-7-one.
3. 6-methyl-6,7-dihydro-5H-dibenz[c,e]azepin-7-one.
4. A method of preparing an azepinone of the formula

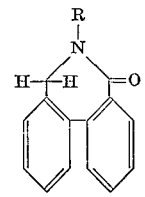

wherein R is hydrogen or lower alkyl having 1–3 carbon atoms which comprises reacting the methyl, ethyl, propyl or isopropyl ester of 2-formyl-2'-biphenylcarboxylic acid with ammonia or a lower alkyl primary amine having only 1–3 carbon atoms and a reducing agent selected from the group consisting of sodium hydrosulfite and hydrogen with the proviso that when said reducing agent is hydrogen said reduction is carried out in the presence of nickel, palladium, or platinum, in a polar solvent that is inert to the reactants under the reaction conditions at a temperature within the range of from about 20° C. to about 150° C. and a pressure in the range of atmospheric pressure up to about 150 p.s.i.g. until said azepinone is formed.

References Cited

UNITED STATES PATENTS 3,454,561   7/1969   Schmutz et al. _____ 260—239.3

HENRY R. JILES, Primary Examiner

R. T. BOND, Assistant Examiner

U.S. Cl. X.R.

260—471, 518, 999

UNITED STATES PATENT OFFICE
CERTIFICATE OF CORRECTION

Patent No. 3,551,414    Dated December 29, 1970

Inventor(s) John O. Hawthorne et al.

It is certified that error appears in the above-identified patent and that said Letters Patent are hereby corrected as shown below:

Column 1, line 16, "formly" should read -- formyl --; line 33, "3,075,96" should read -- 3,075,966 --; line 47, "in" should read -- is --; line 58, "prefarbly" should read -- preferably --; line 59, "codnitions" should read -- condition --. Column 2, line 23, "amion" should read -- amino --. Colum 5, line 49, "(3.03)" should read -- (3.03 g) --. Column 6, after line 56 insert -- Cohen et al 'J. Org. Chem.' Vol. 27, page 3385 (1962) --.

Signed and sealed this 20th day of July 1971.

(SEAL)
Attest:

EDWARD M. FLETCHER, JR.        WILLIAM E. SCHUYLER, JR.
Attesting Officer              Commissioner of Patents